US00RE38391E

(19) United States
(12) Reissued Patent
Glass

(10) Patent Number: US RE38,391 E
(45) Date of Reissued Patent: Jan. 20, 2004

(54) CIRCUIT FOR DETECTING WORD SEQUENCES IN A MODEM

(75) Inventor: William Glass, Seyssinet-Pariset (FR)

(73) Assignee: STMicroelectronics S.A. (FR)

(21) Appl. No.: 09/772,290

(22) Filed: Jan. 29, 2001

Related U.S. Patent Documents

Reissue of:
(64) Patent No.: 5,661,752
Issued: Aug. 26, 1997
Appl. No.: 08/359,470
Filed: Dec. 20, 1994

U.S. Applications:

(63) Continuation of application No. 09/516,565, filed on Feb. 29, 2000, now abandoned, which is a continuation of application No. 09/379,087, filed on Aug. 23, 1999, now abandoned.

(30) Foreign Application Priority Data

Dec. 23, 1993 (FR) ..... 93 15942

(51) Int. Cl.[7] ..... H04B 1/38; H04L 7/00; H04L 27/06

(52) U.S. Cl. ..... 375/222; 375/368; 375/340

(58) Field of Search ..... 375/222, 368, 375/340, 364, 365, 231, 377; 370/509–514; 379/93.01

(56) References Cited

U.S. PATENT DOCUMENTS

| | | | | |
|---|---|---|---|---|
| 3,872,430 | A | 3/1975 | Boudreau et al. | 714/779 |
| 4,035,581 | A | 7/1977 | Milez et al. | 375/330 |
| 4,606,045 | A | 8/1986 | Miller | 375/231 |
| 4,829,462 | A | 5/1989 | Freeman et al. | 340/146.2 |
| 4,847,877 | A | 7/1989 | Besseyre | 375/368 |
| 5,127,027 | A | 6/1992 | Takahashi | 375/362 |
| 5,202,905 | A | 4/1993 | Sakamoto et al. | 375/377 |
| 5,537,549 | A | 7/1996 | Gee et al. | 709/224 |
| 5,793,809 | A | 8/1998 | Holmquist | 375/242 |

FOREIGN PATENT DOCUMENTS

| | | | |
|---|---|---|---|
| EP | A-0238100 | 9/1987 | H04L/7/10 |

OTHER PUBLICATIONS

IEEE Transactions on Communications, vol. 27, No. 9, Sep. 1979, New York US, pp. 1296–1301.

R. Wilson et al. "Generation and Performance of Quadraphase Welti Codes for Radar and Synchronization of Coherent and Differentially Coherent PSK".

Patent Abstracts of Japan vol. 17, No. 328 (E–1385) Jun. 22, 1993 & JP–A–05037511 (NEC).

French Search Report from French patent application No. 9315942 dated Sep. 13, 1994.

*Primary Examiner*—Tesfaldet Bocure
(74) *Attorney, Agent, or Firm*—Lisa K. Jorgenson; James H. Morris

(57) ABSTRACT

A device for identifying a determined repetitive sequence of predetermined signals arriving on a modem. The device includes a delay circuit so that all the words of a sequence are simultaneously present; a combination circuit for providing a combined word; a circuit for calculating the modulus of each combined word and for comparing this modulus with a threshold; a circuit for counting clock pulses corresponding to the rate at which words arrive; a circuit for inhibiting the counting circuit when the modulus of the combined word is lower than the threshold; and a circuit for providing an identification signal when a predetermined number of clock signals is counted.

31 Claims, 2 Drawing Sheets

CIRCUIT FOR DETECTING WORD SEQUENCES IN A MODEM

Matter enclosed in heavy brackets [ ] appears in the original patent but forms no part of this reissue specification; matter printed in italics indicates the additions made by reissue.

*CROSS-REFERENCE TO RELATED APPLICATIONS*

*This application is a continuation of application Ser. No. 09/516,565, filed Feb. 29, 2000, which in turn is a continuation of application Ser. No. 09/379,087, filed Aug. 23, 1999, which in turn is a reissue of U.S. Pat. No. 5,661,752, issued Aug. 26, 1997, entitled CIRCUIT FOR DETECTING WORD SEQUENCES IN A MODEM, filed as application Ser. No. 08/359,470 on Dec. 20, 1994, which applications are incorporated herein by reference.*

BACKGROUND OF THE INVENTION

1. Field of the Invention

The present invention relates to digital modems and more particularly to the detection of predetermined reference word sequences during the initial training procedure between two modems, or during intermediate phases of retraining or modification of the rate.

2. Discussion of the Related Art

In digital modems, the data to be transmitted are digitally encoded from a determined number of symbols and then transmitted as portions of sine wave signals whose phase and amplitude are modulated. Each symbol, for example 128 in accordance with the V32bis standard, corresponds to a signal having a predetermined phase and amplitude. To illustrate this conversion, the symbols can be disposed in a constellation such as illustrated in FIG. 1 where each symbol is disposed at a point corresponding to the phase and amplitude of the modulated signal representing the symbol. Thus, as represented in FIG. 2, each symbol is transmitted as a sine wave portion at a carrier frequency of, for example, 1800 Hz, during bit intervals corresponding to a baud rate of, for example, 2400 Hz. The sine wave is formed and decoded from a sampling frequency that is higher than the baud rate and is a multiple of the latter, for example 9600 Hz.

After decoding, each received Symbol is transformed into a digital word M including a first portion corresponding to the real value of the transmitted word and a second portion b corresponding to the imaginary value of this word. Thus, each word can be expressed by:

$$M=\alpha+jb.$$

Due to the very high exchange rates between two modems, the quality of the telephone connection becomes increasingly important in order to provide reliable transfers of data between two modems. Possible impairments, such as attenuation of the high frequencies of the spectrum, near and far end echo with frequency offset, phase jitter and noise, influence the maximum bit rate possible for minimum errors. In the above V32bis standard, the demodulated complex signal received by a modem is coded on amplitude and phase and a constellation such as the one represented in FIG. 1 contains 128 possible values designed to be transmitted at a data rate of 14,400 bits/second at a baud rate of 2400 Hz. When the above mentioned impairments become more important, the difference between the received point and the ideal receive point, or receive error, becomes increasingly large until, eventually, the decision mechanism of the receiving modem confuses two or more adjacent points, thus causing intolerable errors in the reception.

In contrast, a connection with a slower data rate, such as 7,200 bits/second uses a constellation including only 16 values such as represented in FIG. 3 and permits a much larger tolerance to line impairments. These impairments may vary during the communication in which case the initial transmission rate has to be increased or decreased to find the optimal value. In general, a micro-controller is connected to the modem and can calculate the quality of the received signal, this value corresponding to the inverse of the average receive error. If this error becomes too important, the CCITT recommendations provide for a rate negotiation procedure which is quite short in duration to interrupt data transmission for a very short time of 288 bauds (120 ms) plus the round trip delay between the two modems.

The rate negotiation signal more particularly contains a preamble constituted by a sequence of predetermined signals, the sequence being repeated a determined number of times. Usually, this sequence corresponds to a succession of signals AA for the calling modem and to a succession of signals AC for the called modem. This sequence is repeated 56 times in the preamble. Considering the transmitted signals as a series of sine wave portions, a sequence of signals AA corresponds to an ideal sine wave at a 1800-Hz frequency, and a sequence of signals AC includes two components having a frequency of 600 and 3000 Hz, respectively.

A conventional process to detect the above successions of signals AA or AC uses two banks of digital filters at the front end of the receiver block of the modem. As represented in FIG. 4, the lower bank includes a prefilter F that allows only the frequencies ranging from 600 to 1800 Hz to pass, an energy calculator (providing the absolute square value of the signal) and a low-pass filter LPF1 of the first order. The upper bank includes a highly selective band-pass filter BPF centered on 600 or 1800 Hz followed by another energy calculator and by a low-pass filter LPF2. The outputs of the low-pass filters LPF1 and LPF2 are transmitted to a comparator 10. When sequences of signals AA or AC are present and when the band-pass filter BPF is centered on 600 or 1800 Hz, respectively, the energy in the upper bank is comparable to the energy in the lower bank. When a data signal is present, the upper bank provides a much lower level than the lower bank. This conventional process is satisfactory for the detection of sequences AA and AC during the initial handshake or retrain procedure where the duration of the analysis is relatively long. However, for operations to be carried out rapidly such as a rate negotiation operation, this procedure is less satisfactory since, in particular, it needs a relatively narrow band-pass filter BPF, which involves a relatively long response time. If it is desired to decrease this response time, selectivity is decreased, which results in a higher risk of false detection.

SUMMARY OF THE INVENTION

Thus, an object of the present invention is to provide a detection circuit for detecting a sequence of predetermined signals having a relatively short response time.

A further object of the present invention is to provide such a detection circuit that does not use any filtering circuitry.

These objects are achieved in one illustrative embodiment of the present invention, wherein a method for detecting a determined repetitive sequence of predetermined signals arriving on a modem, each signal being digitized as a word having a first portion corresponding to a real value and a second portion corresponding to an imaginary value, the method including the steps of delaying words of a sequence so that all the words are simultaneously present; linearly combining said words to provide a combined word with substantially null real and imaginary values; determining the modulus of each combined word; comparing this modulus with a threshold; when the modulus of the combined word is lower than the threshold, counting clock pulses corresponding to the rate at which the words arrive; and providing an identification signal when a predetermined number of clock signals is counted.

According to another embodiment of the present invention, each sequence includes two words, one of which is the inverse of the other, the linear combination being an addition.

According to a further embodiment of the present invention, each sequence includes two identical words, the linear combination being a subtraction.

According to an additional embodiment of the present invention, all the words of the sequence have a predetermined modulus, and the process further includes the steps of determining the modulus of each incoming word and resetting counting when the modulus deviates from its predetermined value by more than a predetermined threshold.

Another illustrative embodiment of the present invention provides a device for identifying a repetitive predetermined sequence of determined signals arriving on a modem, each of these signals being digitized as a word including a first portion corresponding to a real value and a second portion corresponding to an imaginary value. The device includes means for suitably delaying words of a sequence in order that all the words are present simultaneously; means for linearly combining the words to provide a combined word having substantially null real and imaginary values; means for calculating the modulus of each combined word; means for comparing this modulus with a threshold; means for counting clock pulses corresponding to the rate of arrival of the words; means for resetting the counting means when the modulus of the combined word is lower than the threshold; and means for providing an identification signal when a predetermined number of clock signals has been counted.

The foregoing and other objects, features, aspects and advantages of the invention will become apparent from the following detailed description of the present invention when taken in conjunction with the accompanying drawings.

DETAILED DESCRIPTION

Figure 5:
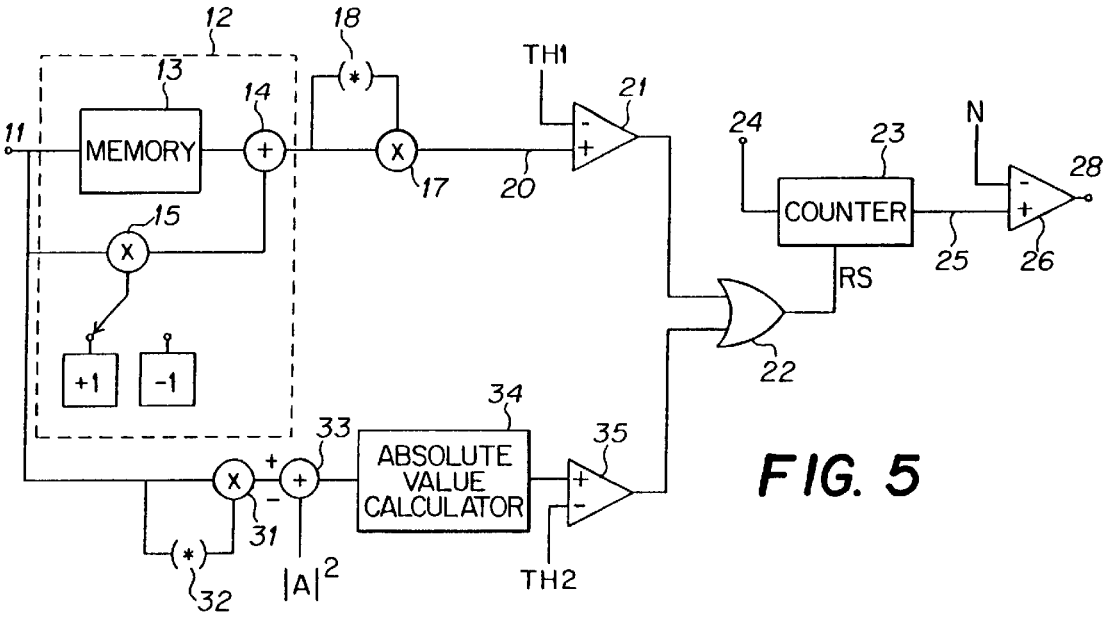
FIG. 5 represents an exemplary embodiment of the invention for detecting a sequence of signals AA or AC.

The circuit according to the invention represented in FIG. 5 is part of a modem that during a receive phase receives digitized signals at its input 11. These signals arrive at the rate of a baud clock or symbol clock and are, for example, constituted by a word formed by two successive 16-bit portions corresponding to the real portion and to the imaginary portion of a received symbol, respectively. The input words are transmitted to a combinatory logic circuit 12 which, in the given example, includes a memory 13 of one word (real part and imaginary part) having an output provided to a complex adder 14. The other input of adder 14 receives the input signal 11 after passage through a multiplier 15. Thus, a linear combination of two successive words is carried out. When the sequence to be detected is constituted by a succession of identical words, for example AA . . . , multiplier 15 is a multiplier by −1 and, if this sequence is received, the output of adder 14 is normally zero. If the expected sequence is sequence ACAC . . . (refer FIGS. 1 and 3), that is, a sequence, wherein one signal is the complement of the next one (in the present description, "complement" is to be construed as "negative"), multiplier 15 is a multiplier by +1 and the output of adder 14 is normally zero if sequence ACAC . . . is received. More generally, it will be noted that it is merely necessary to provide a combinatory circuit 12 for combining successive signals having predetermined values in order to supply a zero value at the output when these signals are received.

In practice, since the lines are always noisy, the output of adder 14 is not strictly zero when the incoming signals are the expected signals. Accordingly, adder 14 is followed by an energy calculation circuit including a multiplier 17 receiving, on the one hand, directly the output of adder 14 and, on the other hand, this output through a circuit 18 providing the complex conjugate. The output signal 20 of multiplier 17 is provided to a first input of a comparator 21 that compares this Signal with a threshold TH1. Comparator 21 has an output at a high level when the signal at input 20 is higher than the threshold, and has an output at a low level when the signal is lower than the threshold. The output of comparator 21 is provided through an OR gate 22 to the reset input RS of a counter 23 that receives at its input 24 signals arriving at the same rate as data are introduced at input 11, that is, the signal at input 24 is normally the baud clock. Thus, as long as the output of comparator 21 is at a low level, counter 23 counts and as soon as output 21 reaches a high level, the counter is reset and the next counting begins at zero. The output of counter 23 is applied to an input 25 of a comparator 26 that compares this output with a predetermined value N, for example equal to 32. Thus, when a counting equal to 32 has occurred, a signal appears at the output terminal 28 of comparator 26. This signal at terminal 28 is an identification signal since it indicates that the output of comparator 21 has been 32 successive times at a low level, that is, its input was 32 successive times lower than threshold TH1. This means that signals corresponding to a sequence ACAC . . . were received 32 successive times (when multiplier 15 is a multiplier by +1) or a sequence AAA . . . (when multiplier 15 is a multiplier by −1).

Figure 1:
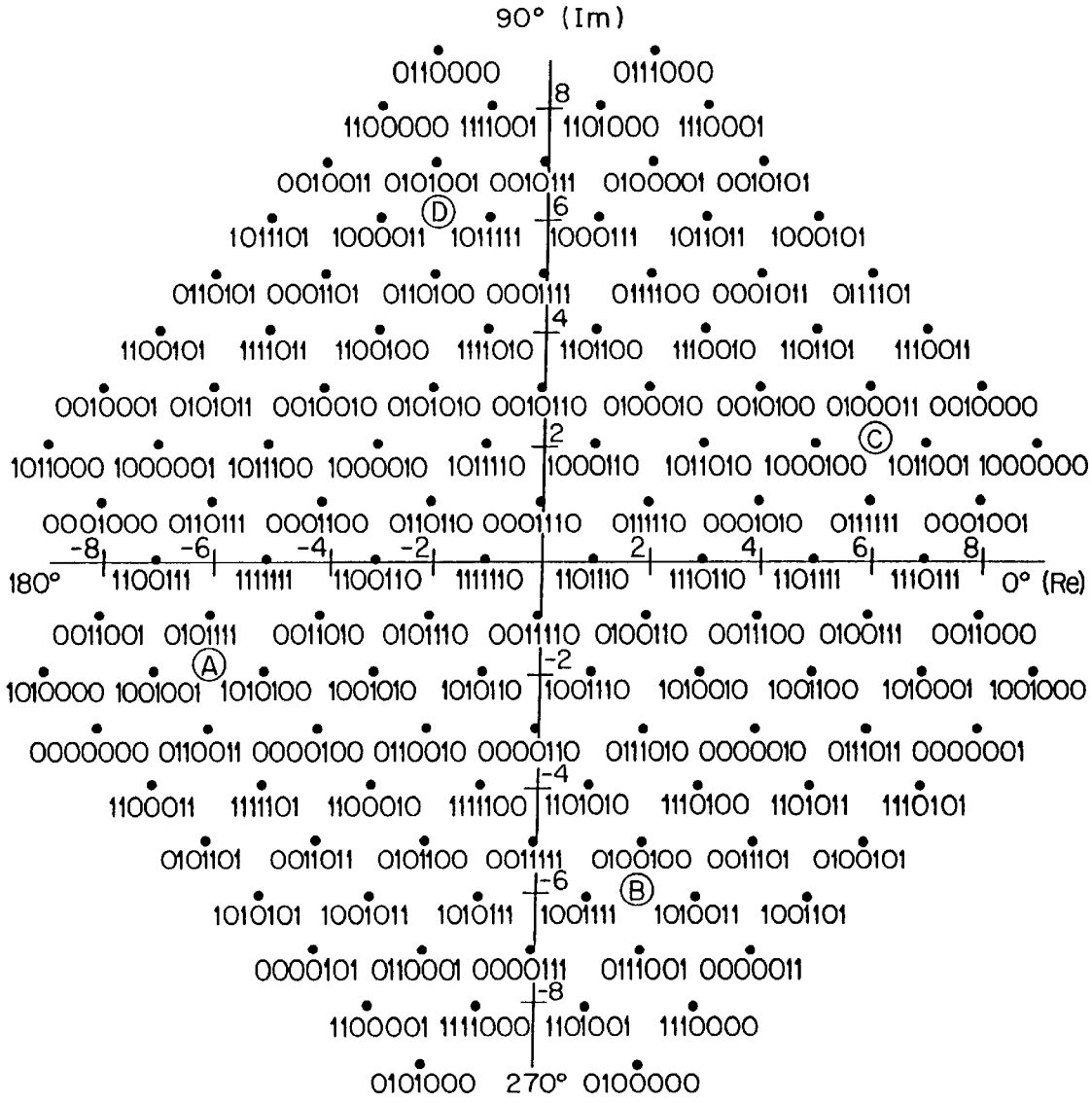
FIG. 1 represents a constellation of 128 symbols in accordance with the V.32bis standard.
Figure 2:
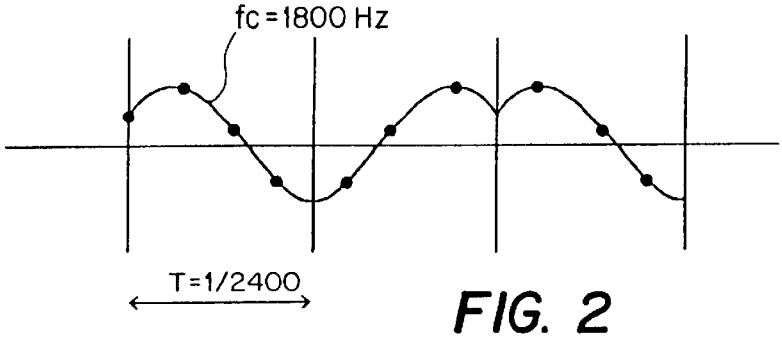
FIG. 2 represents by way of example the way in which each symbol is transmitted on a telephone line.
Figure 3:
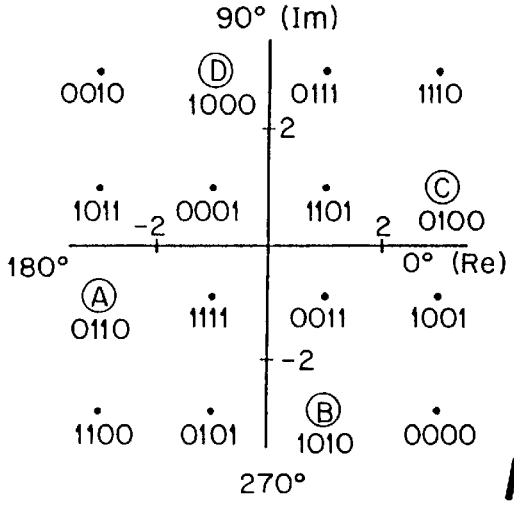
FIG. 3 represents a constellation of 16 symbols in accordance with the V.32bis standard.
Figure 4:
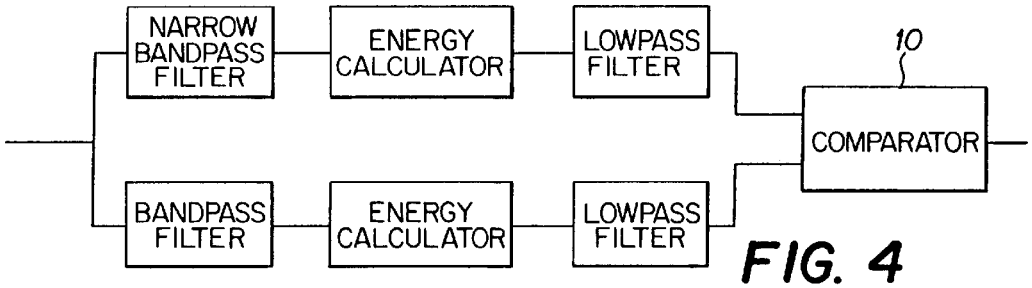
FIG. 4 (PRIOR ART)
FIG. 4 represents a circuit for identifying a sequence of signals AA or AC according to the prior art.

Indeed, it is necessary to wait for a determined number of passages of signal 20 at a low level to, detect with certainty a sequence because the combinatory circuit 12 provides a low output each time successive signals exhibiting a predetermined (for example identical or reverse) relation are provided thereto; this can occur during a signal transmission for specific signals, as is apparent by studying the constellations of FIGS. 1 and 3.

However, there is a case when an erroneous detection of a sequence such as ACAC . . . may happen, that is, when no signal arrives at terminal 11, or more precisely when only noise arrives due to a temporary misfunction of the telephone link. The lower branch of the circuit of FIG. 5 solves this problem and avoids other ambiguities.

This lower branch includes a circuit for determining the energy of the incoming signal. The circuit includes a multiplier 31, whose first input directly receives the signal of terminal 11, and whose second input receives its complex conjugate through a circuit 32. The average energy $A^2$ of signal A or C is subtracted from this energy (it should be noted that these signals have the safe modulus). This operation is carried out in an adder 33 whose output is provided to an absolute value calculator. 34. The output of circuit 34 is provided to the first, input of a comparator 35, whose second input receives a threshold signal TH2. The output of comparator 35 is provided to a second input of the OR gate 22. Thus, if the signal at terminal 11 is a signal having the same modulus as a signal A or C, the output of circuit 34 will be substantially zero and the output of comparator 35 will be zero. Accordingly, this signal will not affect the output of the OR gate 22. In contrast, if the signal at terminal 11 has a modulus different from the modulus of A, for example because it corresponds to a symbol having a different value or because it corresponds only to noise the output of comparator 35 will be at a high level and counter 23 will be reset.

Various other safety circuits can be devised by those skilled in the art.

Of course, although for the sake of simplification, the above description has been made using terms sometimes corresponding to analog systems, it will clearly appear to those skilled in the art that all the elements of the circuit according to the invention process digital signals and that the components of the circuit illustrated as hardware are often in practice embodied as software operating on a processor.

Having thus described one particular embodiment of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is not intended to be limiting. The invention is limited only as defined in the following claims and the equivalents thereto.

What is claimed is:

1. A process for identifying a predetermined repetitive pattern of signals in a sequence of words arriving on a modem, each signal being digitized as a word having a first portion corresponding to a real value and a second portion corresponding to an imaginary value, the process including the steps of:

A. delaying at least one word of the sequence so that a plurality of words is simultaneously present;

B. linearly combining the plurality of words to provide a combined word;

C. determining a first magnitude of the combined word;

D. comparing the first magnitude with a threshold;

E. when the first magnitude is lower than the threshold, counting clock pulses corresponding to a rate at which words arrive on the modem; and F. providing an identification signal when a predetermined number of continuous clock pulses is counted.

2. The process of claim 1, wherein the predetermined repetitive pattern includes a first word and a second word, the first word being the inverse of the second word, and wherein the step of linearly combining comprises mathematically adding.

3. The process of claim 1, wherein the predetermined repetitive pattern includes a first word and a second word, the first word being identical to the second word, and wherein the step of linearly combining comprises mathematically subtracting.

4. The process of claim 1, wherein each of the words of the predetermined repetitive pattern has a predetermined magnitude, and wherein the process further includes the steps of:

G. determining a second magnitude of each word arriving on the modem; and

H. inhibiting the counting of clock pulses in step E when the magnitude for any word deviates from the predetermined magnitude by more than a predetermined threshold.

5. A device for identifying a predetermined repetitive pattern of signals in a sequence of words arriving on a modem, the signals being digitized as words, each word having a first portion corresponding to a real value and a second portion corresponding to an imaginary value, the words arriving on the modem in a sequence, the device comprising:

first means, electrically connectable to the modem, for delaying at least one word of the sequence so that a plurality of words is simultaneously present in the device;

second means, connected to the first means, for linearly combining the words to provide a combined word;

third means, connected to the second means, for determining a first magnitude of the combined word fourth means, connected to the third means, for comparing the first magnitude with a threshold;

fifth means, connected to the fourth means, for, when the first magnitude of the combined word is lower than the threshold, counting clock pulses corresponding to a rate at which the words arrive on the modem; and sixth means, connected to the fifth means, for providing an identification signal when a predetermined number of continuous clock signals has been counted.

6. The device of claim 5, wherein each of the words of the predetermined repetitive pattern of signals has a predetermined magnitude, and wherein the device further comprises:

seventh means, for determining a magnitude of each word arriving on the modem; and eighth means, connected to the fifth means and the seventh means, for inhibiting counting of the clock pulses when the magnitude of a word arriving on the modem deviates from the predetermined magnitude by more than a predetermined threshold.

7. The device of claim 5, wherein the predetermined repetitive pattern includes a first word and a second word, the first word being the inverse of the second word, and wherein the second means includes means for performing a mathematical addition.

8. The device of claim 5, wherein the predetermined repetitive pattern includes a first word and a second word, the first word being identical to the second word, and wherein the second means includes means for performing a mathematical subtraction.

9. The device of claim 5, wherein said second means includes means for combining two consecutive words so that the combined word has a null value when the predetermined repetitive pattern is present in the two consecutive words.

10. A method for detecting a predetermined pattern of digital words within a continuous sequence of digital words, comprising the steps of:

A. combining consecutive pairs of digital words in the continuous sequence to form a series of combined words;

B. setting a count indicator to zero when a magnitude of a combined word from the series of combined words is greater than a first threshold;

C. incrementing the count indicator once for each combined word having a magnitude [greater] *less* than the first threshold; and D. indicating detection of the predetermined pattern of digital words when the count indicator is incremented beyond a predetermined count value.

11. The method of claim 10, wherein step A includes mathematically adding consecutive pairs of digital words to create a sum for each consecutive pair.

12. The method of claim 11, wherein the continuous sequence of digital words is received on a calling modem, and detection of the predetermined pattern of digital words represents detection of a rate negotiation signal.

13. The method of claim 10, wherein each consecutive pair includes a first word and a second word, and wherein step A includes mathematically subtracting the first word from the other second word for each consecutive pair to create a difference for each consecutive pair.

14. The method of claim 13, wherein the continuous sequence of digital words is received on a called modem, and detection of the predetermined pattern of digital words represents detection of a rate negotiation signal.

15. The method of claim 10, further comprising the steps of:

E. calculating a magnitude of each word in the continuous sequence of digital words; and F. setting the count indicator to zero when the magnitude for any word exceeds a second threshold.

16. The method of claim 10, wherein the predetermined count value is 32.

17. An apparatus for detecting a predetermined pattern of digital words from a continuous sequence of digital words, comprising:

means for combining consecutive pairs of digital words in the continuous sequence of digital words to form a series of combined words;

means for setting a count indicator to zero when a magnitude of a combined word from the series of combined words is greater than a first threshold;

means for incrementing the count indicator once for each combined word having a magnitude [greater] *less* than the first threshold and means for indicating detection of the predetermined pattern when the count indicator is incremented beyond a predetermined count value.

18. The apparatus of claim 17, wherein the means for combining includes means for mathematically adding pairs of consecutive digital words to create a sum for each consecutive pair.

19. The apparatus of claim 18, wherein the continuous sequence of digital words is received on a calling modem, and detection of the predetermined pattern represents detection of a rate negotiation signal.

20. The apparatus of claim 17, wherein each pair of concentric words includes a first word and a second word, and wherein the means for combining includes means for mathematically subtracting the first word from the second word to create a difference for each consecutive pair.

21. The apparatus of claim 20, wherein the continuous sequence of digital words is received on a called modem, and detection of the predetermined pattern represents detection of a rate negotiation signal.

22. The apparatus of claim 17, further comprising:

means for calculating a magnitude of each word in the continuous sequence of digital words; and means for setting the count indicator to zero when the magnitude of any word exceeds a second threshold.

23. The apparatus of claim 17, wherein the predetermined count value is 32.

24. An apparatus for detecting a predetermined pattern of digital signals from a continuous sequence of digital words arriving at the apparatus at a baud rate, comprising:

a counting circuit having a reset input and an output indicating a number of times counted, the counting circuit incrementing at the baud rate;

a combinatorial logic circuit having an output, coupled to the reset input of the counting circuit, which resets the counting circuit when a mathematical combination of two successive words arriving at the apparatus exceeds a first threshold; and an indicator circuit, coupled to the output of the counting circuit, which asserts a detection signal when the output of the counting circuit exceeds a predetermined count value.

25. The apparatus of claim 24, wherein the counting circuit includes a counter having a reset terminal connected to the output of the combinatorial logic circuit, an input terminal connected to a signal representing the baud rate, and an output terminal connected to the indicator circuit.

26. The apparatus of claim 24, wherein the combinatorial logic circuit comprises:

a delay circuit, coupled to a source of the continuous sequence of digital words, which delays the continuous sequence of digital words by one word;

a mathematical calculator, coupled to the delay circuit and to the source of the continuous sequence of digital words, having an output which provides a linear combination of each pair of consecutive digital words;

a complex conjugate magnitude calculator with an output and an input connected to the output of the mathematical calculator; and a comparator, having a first input connected to a signal representing [a] *the* first threshold, a second input connected to the output of the complex conjugate magnitude calculator, and an output, coupled to the reset input of the counting circuit, which is activated whenever the output of the complex conjugate magnitude calculator is greater than the first threshold input.

27. The apparatus of claim 26, wherein the mathematical calculator comprises:

an adder/subtractor that generates a mathematical combination of each pair of consecutive digital words, the mathematical combination being one of a sum of the pair of consecutive digital words and a difference between the pair of consecutive digital words.

28. The apparatus of claim 24, wherein the indicator circuit comprises a comparator having a first input connected to a signal representing the predetermined count value, a second input connected to output of the counting circuit, and an output that is activated whenever the output of the counting count is greater then the predetermined count value.

29. The apparatus of claim 24, further comprising:

a magnitude circuit having an input connected to a source of the continuous sequence of digital words, and an output, connected to the counting circuit reset input, that asserts a reset signal when the magnitude of a word from the continuous sequence of words exceeds a second threshold.

30. The apparatus of claim 29, wherein the magnitude circuit comprises:

a complex conjugate magnitude calculator with an output and an input connected to the source of the continuous [stream] *sequence* of digital words; and a comparator having a first input connected to a signal representing the second threshold, a second input connected to the output of the complex conjugate magnitude calculator, and an output that is activated whenever the output of the complex conjugate magnitude calculator exceeds the second threshold.

31. The apparatus of claim 24, wherein the continuous sequence of digital words is received on a modem, and assertion of the detection signal indicates detection of a rate negotiation signal.

* * * * *